(12) United States Patent
Vu (10) Patent No.: US 9,879,761 B2
(45) Date of Patent: Jan. 30, 2018

(54) POWERSHIFT TRANSMISSION WITH TWENTY-SEVEN FORWARD MODES

(71) Applicant: Deere & Company, Moline, IL (US)

(72) Inventor: Thomas H. Vu, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 520 days.

(21) Appl. No.: 14/528,220

(22) Filed: Oct. 30, 2014

(65) Prior Publication Data

US 2016/0123430 A1    May 5, 2016

(51) Int. Cl.
*F16H 3/093* (2006.01)
*F16H 3/08* (2006.01)

(52) U.S. Cl.
CPC ..... *F16H 3/093* (2013.01); *F16H 2003/0822* (2013.01); *F16H 2200/0078* (2013.01)

(58) Field of Classification Search
CPC .............................................. F16H 2200/0078
See application file for complete search history.

(56) References Cited

U.S. PATENT DOCUMENTS

| 5,011,465 | A | * | 4/1991 | Jeffries | F16H 3/66 |
|---|---|---|---|---|---|
| | | | | | 475/279 |
| 5,063,793 | A | | 11/1991 | McAskill | |
| 8,596,157 | B2 | | 12/2013 | Vu | |
| 2012/0048043 | A1 | * | 3/2012 | Vu | F16H 37/043 |
| | | | | | 74/331 |
| 2012/0071290 | A1 | * | 3/2012 | Byun | B62M 11/18 |
| | | | | | 475/288 |
| 2012/0172171 | A1 | * | 7/2012 | Byun | B62M 11/18 |
| | | | | | 475/275 |
| 2013/0192397 | A1 | * | 8/2013 | Jerwick | F16H 3/091 |
| | | | | | 74/329 |
| 2015/0183486 | A1 | * | 7/2015 | Watarai | B62J 99/00 |
| | | | | | 701/37 |
| 2016/0377155 | A1 | * | 12/2016 | Raisch | F16H 37/042 |
| | | | | | 475/207 |

OTHER PUBLICATIONS

Bicycle Universe, https://web.archive.org/web/20120414095735/http://bicycleuniverse.info/eqp/gears.html, Apr. 14, 2012.*

* cited by examiner

*Primary Examiner* — William Kelleher
*Assistant Examiner* — Gregory Prather (57) ABSTRACT

In accordance with an example embodiment, a powershift transmission may include an input shaft, a first counter shaft, a second counter shaft, and an output shaft operably connected to a transmission housing. The powershift transmission may include a plurality of gears and clutches arranged on the shafts resulting in twenty-seven forward modes.

9 Claims, 8 Drawing Sheets

| Shaft | Gear | Reference | No. of Teeth |
|---|---|---|---|
| Input Shaft A | First Gear | G1 | 38 |
| Input Shaft A | Second Gear | G2 | 37 |
| Input Shaft A | Third Gear | G3 | 37 |
| Counter Shaft B | Fourth Gear | G4 | 46 |
| Counter Shaft B | Fifth Gear | G5 | 30 |
| Counter Shaft B | Sixth Gear | G6 | 34 |
| Counter Shaft B | Seventh Gear | G7 | 49 |
| Counter Shaft B | Eighth Gear | G8 | 39 |
| Counter Shaft B | Ninth Gear | G9 | 33 |
| Counter Shaft C | Tenth Gear | G10 | 88 |
| Counter Shaft C | Eleventh Gear | G11 | 26 |
| Counter Shaft C | Twelfth Gear | G12 | 77 |
| Counter Shaft C | Thirteenth Gear | G13 | 51 |
| Counter Shaft C | Fourteenth Gear | G14 | 55 |
| Counter Shaft C | Fifteenth Gear | G15 | 56 |
| Output Shaft D | Sixteenth Gear | G16 | 25 |
| Output Shaft D | Seventeenth Gear | G17 | 88 |
| Output Shaft D | Eighteenth Gear | G18 | 50 |
| Input Shaft A | Reverse Drive Gear | RG1 | 29 |
| Reverse Idler Shaft R1 | Reverse Idler Gear | RG2 | 31 |
| Counter Shaft B | Reverse Driven Gear | RG3 | 55 |

FIG. 3

| Clutch | | R | L | M | H | S1 | S2 | S3 |
|---|---|---|---|---|---|---|---|---|
| Drive Gear | No. of Teeth | RG1 29 | G1 38 | G3 37 | G2 37 | G5 30 | G9 33 | G7 49 |
| Driven Gear | No. of Teeth | RG3 55 | G4 46 | G8 39 | G6 34 | G12 77 | G15 56 | G14 55 |
| Ratio: | | 1.897 | 1.211 | 1.054 | 0.919 | 2.567 | 1.697 | 1.122 |

Continued →

| RC1 | | RC2 | | RC3 | |
|---|---|---|---|---|---|
| G11 | 26 | G13 | 51 | G10 | 88 |
| G17 | 88 | G18 | 50 | G16 | 25 |
| 3.385 | | 0.980 | | 0.284 | |

| Mode | R | L | M | H | S1 | S2 | S3 | RC1 | RC2 | RC3 | Input Shaft A, Speed (RPM) | Counter Shaft B, Speed (RPM) | Counter Shaft C, Speed (RPM) | Output Shaft D, Speed (RPM) | Transmission Ratio | Transmission Steps |
|---|---|---|---|---|---|---|---|---|---|---|---|---|---|---|---|---|
| F1 | X | X |   |   | X |   |   | X |   |   | 2100 | -1735 | 676  | -200  | 10.516 |       |
| F2 | X |   | X |   | X |   |   | X |   |   | 2100 | -1992 | 776  | -229  | 9.157  | 14.8% |
| F3 | X |   |   | X | X |   |   | X |   |   | 2100 | -2285 | 890  | -263  | 7.983  | 14.7% |
| F4 | X | X |   |   |   | X |   | X |   |   | 2100 | -1735 | 1022 | -302  | 6.953  | 14.8% |
| F5 | X |   | X |   |   | X |   | X |   |   | 2100 | -1992 | 1174 | -347  | 6.054  | 14.8% |
| F6 | X |   |   | X |   | X |   | X |   |   | 2100 | -2285 | 1347 | -398  | 5.278  | 14.7% |
| F7 | X | X |   |   |   |   | X | X |   |   | 2100 | -1735 | 1546 | -457  | 4.599  | 14.8% |
| F8 | X |   | X |   |   |   | X | X |   |   | 2100 | -1992 | 1775 | -524  | 4.004  | 14.8% |
| F9 | X |   |   | X |   |   | X | X |   |   | 2100 | -2285 | 2036 | -602  | 3.491  | 14.7% |
| F10 | X | X |   |   | X |   |   |   | X |   | 2100 | -1735 | 676  | -689  | 3.046  | 14.6% |
| F11 | X |   | X |   | X |   |   |   | X |   | 2100 | -1992 | 776  | -792  | 2.652  | 14.8% |
| F12 | X |   |   | X | X |   |   |   | X |   | 2100 | -2285 | 890  | -908  | 2.312  | 14.7% |
| F13 | X | X |   |   |   | X |   |   | X |   | 2100 | -1735 | 1022 | -1043 | 2.014  | 14.8% |
| F14 | X |   | X |   |   | X |   |   | X |   | 2100 | -1992 | 1174 | -1198 | 1.754  | 14.8% |
| F15 | X |   |   | X |   | X |   |   | X |   | 2100 | -2285 | 1347 | -1374 | 1.529  | 14.7% |
| F16 | X | X |   |   |   |   | X |   | X |   | 2100 | -1735 | 1546 | -1576 | 1.332  | 14.8% |
| F17 | X |   | X |   |   |   | X |   | X |   | 2100 | -1992 | 1775 | -1810 | 1.160  | 14.8% |
| F18 | X |   |   | X |   |   | X |   | X |   | 2100 | -2285 | 2036 | -2077 | 1.011  | 14.7% |
| F19 | X | X |   |   | X |   |   |   |   | X | 2100 | -1735 | 676  | -2379 | 0.883  | 14.6% |
| F20 | X |   | X |   | X |   |   |   |   | X | 2100 | -1992 | 776  | -2732 | 0.769  | 14.8% |
| F21 | X |   |   | X | X |   |   |   |   | X | 2100 | -2285 | 890  | -3134 | 0.670  | 14.7% |
| F22 | X | X |   |   |   | X |   |   |   | X | 2100 | -1735 | 1022 | -3598 | 0.584  | 14.8% |
| F23 | X |   | X |   |   | X |   |   |   | X | 2100 | -1992 | 1174 | -4133 | 0.508  | 14.8% |
| F24 | X |   |   | X |   | X |   |   |   | X | 2100 | -2285 | 1347 | -4740 | 0.443  | 14.7% |
| F25 | X | X |   |   |   |   | X |   |   | X | 2100 | -1735 | 1546 | -5440 | 0.386  | 14.8% |
| F26 | X |   | X |   |   |   | X |   |   | X | 2100 | -1992 | 1775 | -6248 | 0.336  | 14.8% |
| F27 | X |   |   | X |   |   | X |   |   | X | 2100 | -2285 | 2036 | -7167 | 0.293  | 14.7% |

Clutches Engaged | 2100 Engine RPM at Transmission Input | Total Transmission Ratio 35.9

FIG. 6

2100 Engine RPM at Transmission Input

| Mode | Clutches Engaged | | | | | | | | | | Input Shaft A, Speed (RPM) | Counter Shaft B, Speed (RPM) | Counter Shaft C, Speed (RPM) | Output Shaft D, Speed (RPM) | Transmission | |
|---|---|---|---|---|---|---|---|---|---|---|---|---|---|---|---|---|
| | R | L | M | H | S1 | S2 | S3 | RC1 | RC2 | RC3 | | | | | Ratio | Steps |
| R1 | X | | | | X | | | X | | | 2100 | 1107 | -431 | 127 | 16.476 | |
| R2 | X | | | | | X | | X | | | 2100 | 1107 | -653 | 193 | 10.893 | 51.3% |
| R3 | X | | | | | | X | X | | | 2100 | 1107 | -986 | 291 | 7.205 | 51.2% |
| R4 | X | | | | X | | | | X | | 2100 | 1107 | -431 | 440 | 4.772 | 51% |
| R5 | X | | | | | X | | | X | | 2100 | 1107 | -653 | 666 | 3.155 | 51.3% |
| R6 | X | | | | | | X | | X | | 2100 | 1107 | -986 | 1006 | 2.087 | 51.2% |
| R7 | X | | | | X | | | | | X | 2100 | 1107 | -431 | 1519 | 1.383 | 50.9% |
| R8 | X | | | | | X | | | | X | 2100 | 1107 | -653 | 2297 | 0.914 | 51.3% |
| R9 | X | | | | | | X | | | X | 2100 | 1107 | -986 | 3472 | 0.605 | 51.2% |

POWERSHIFT TRANSMISSION WITH TWENTY-SEVEN FORWARD MODES

CROSS-REFERENCE TO RELATED APPLICATIONS

Not Applicable.

FIELD OF THE DISCLOSURE

The present disclosure relates generally to powershift transmissions.

BACKGROUND

A powershift transmission is a speed and power changing device installed between a power source and a final drive of a work machine. Powershift transmissions are often used in work machines such as, for example, agricultural and industrial machines.

A powershift transmission has lower forward modes and higher forward modes. The lower forward modes are, typically, used for propelling work machines at low speeds. In the lower forward modes, an output shaft of the powershift transmission is rotating slowly but with a relatively high amount of torque. On the other hand, the higher forward modes are, generally, for propelling the work machine at high speeds in, for example, transport. In higher forward modes, the output shaft of the powershift transmission is rotating relatively quickly but with a relatively low amount of torque.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a powershift transmission may include an input shaft, a first counter shaft, a second counter shaft, and an output shaft operably connected to a transmission housing. The powershift transmission may include a plurality of gears and clutches arranged on the shafts resulting in twenty-seven forward modes.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
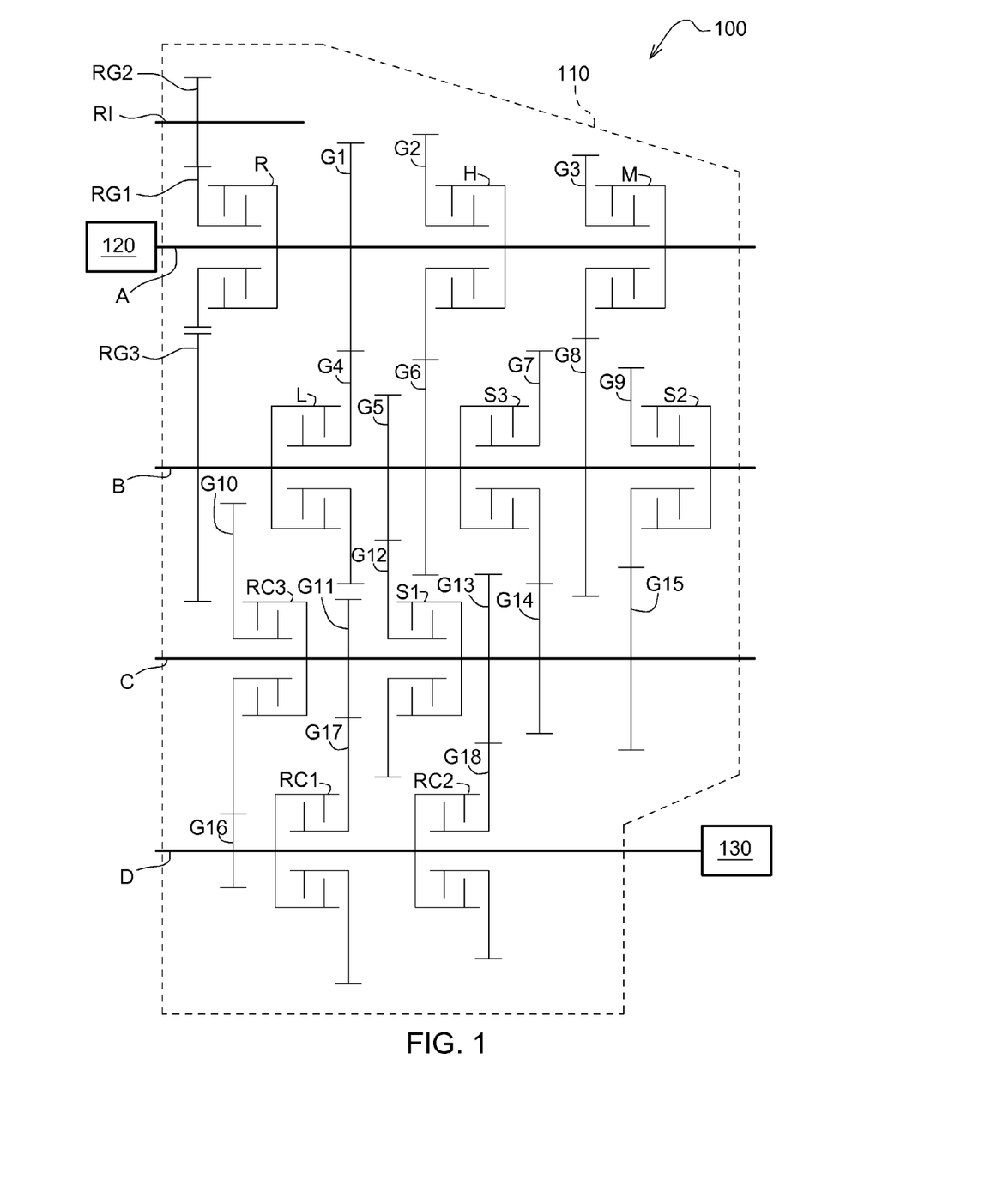
FIG. 1 is a schematic of a powershift transmission, according to one embodiment.

FIG. 1 illustrates a powershift transmission 100, according to one embodiment. The powershift transmission 100 may be used for work machines, including but not limited to agricultural and industrial machines. The powershift transmission 100 may include a housing 110, which provides an enclosure for the various transmission components. The powershift transmission 100 may include an input shaft A, a counter shaft B, a counter shaft C, an output shaft D, and a reverse idler shaft RI. Although the reverse idler shaft RI is shown positioned above the input shaft A, the reverse idler shaft RI may be located between the input shaft A and the first counter shaft B, as shown, for example, in FIG. 2. The shafts A, B, C, D, and RI are rotatably connected or attached to the housing 110. The input shaft A may be operatively connected to any power source 120 capable of rotating input shaft A. The power source 120 may be, for example, one or more diesel engines, gasoline engines, electric motors, or other power sources, individually or in combination. The output shaft D may be operatively connected to a final drive 130 of a work machine (not shown) for movement in the forward or reverse directions. The final drive 130 may be, for example, one or more differential assemblies, axle assemblies, or other drive assemblies, individually or in combination. The shafts, gears, and other transmission components may be made of, for example, alloy steel AISI 8620 or any other suitable material chosen by a person of ordinary skill in the art.

A first gear G1 may be fixedly connected to or mounted on the input shaft A, causing the first gear G1 to rotate with the input shaft A. The first gear G1 may be, for example, formed into or splined or welded onto or about input shaft A. A second gear G2 may be rotatably connected to or mounted about the input shaft A, allowing the second gear G2 to rotate relative to or independently of the input shaft A. A third gear G3 may be rotatably connected to or mounted about the input shaft A, allowing the third gear G3 to rotate relative to or independently of the input shaft A.

A fourth gear G4 may be rotatably connected to or mounted about the first counter shaft B, allowing the fourth gear G4 to rotate relative to or independently of the first counter shaft B. A fifth gear G5 may be fixedly connected to or mounted on the first counter shaft B, causing the fifth gear G5 to rotate with the first counter shaft B. The fifth gear G5 may be, for example, formed into or splined or welded onto or about first counter shaft B. A sixth gear G6 may be fixedly connected to or mounted on the first counter shaft B, causing the sixth gear G6 to rotate with the first counter shaft B. The sixth gear G6 may be, for example, formed into or splined or welded onto or about first counter shaft B. A seventh gear G7 may be rotatably connected to or mounted about the first counter shaft B, allowing the seventh gear G7 to rotate relative to or independently of the first counter shaft B. A eighth gear G8 may be fixedly connected to or mounted on the first counter shaft B, causing the eighth gear G8 to rotate with the first counter shaft B. The eighth gear G8 may be, for example, formed into or splined or welded onto or about first counter shaft B. A ninth gear G9 may be rotatably connected to or mounted about the first counter shaft B, allowing the ninth gear G9 to rotate relative to or independently of the first counter shaft B.

A tenth gear G10 may be rotatably connected to or mounted about the second counter shaft C, allowing the tenth gear G10 to rotate relative to or independently of the second counter shaft C. A eleventh gear G11 may be fixedly connected to or mounted on the second counter shaft C, causing the eleventh gear G11 to rotate with the second counter shaft C. The eleventh gear G11 may be, for example, formed into or splined or welded onto or about second counter shaft C. A twelfth gear G12 may be rotatably connected to or mounted about the second counter shaft C, allowing the twelfth gear G12 to rotate relative to or independently of the second counter shaft C. A thirteenth gear G13 may be fixedly connected to or mounted on the second counter shaft C, causing the thirteenth gear G13 to rotate with the second counter shaft C. The thirteenth gear G13 may be, for example, formed into or splined or welded onto or about second counter shaft C. A fourteenth gear G14 may be fixedly connected to or mounted on the second counter shaft C, causing the fourteenth gear G14 to rotate with the second counter shaft C. The fourteenth gear G14 may be, for example, formed into or splined or welded onto or about second counter shaft C. A fifteenth gear G15 may be fixedly connected to or mounted on the second counter shaft C, causing the fifteenth gear G15 to rotate with the second counter shaft C. The fifteenth gear G15 may be, for example, formed into or splined or welded onto or about second counter shaft C.

A sixteenth gear G16 may be fixedly connected to or mounted on the second counter shaft C, causing the sixteenth gear G16 to rotate with the second counter shaft C. The sixteenth gear G16 may be, for example, formed into or splined or welded onto or about second counter shaft C. A seventeenth gear G17 may be rotatably connected to or mounted about the output shaft D, allowing the seventeenth gear G17 to rotate relative to or independently of the output shaft D. A eighteenth gear G18 may be rotatably connected to or mounted about the output shaft D, allowing the eighteenth gear G18 to rotate relative to or independently of the output shaft D.

A reverse drive gear RG1 may be rotatably connected to or mounted about the input shaft A, allowing the reverse drive gear RG1 to rotate relative to or independently of the input shaft A. A reverse idler gear RG2 may be fixedly connected to or mounted on the reverse idler shaft RI, causing the reverse idler gear RG2 to rotate with the reverse idler shaft RI. The reverse idler gear RG2 may be, for example, formed into or splined or welded onto or about reverse idler shaft RI. A reverse driven gear RG3 may be rotatably connected to or mounted about the first counter shaft B, allowing the reverse driven gear RG3 to rotate relative to or independently of the first counter shaft B.

A high clutch H may be fixedly connected to or mounted on the input shaft A, causing the high clutch H to rotate with the input shaft A. Alternatively, the high clutch H may be fixedly connected to or mounted on and rotate with the second gear G2. The high clutch H is selectively engageable. When the high clutch H is engaged, the high clutch H releasably connects or fixes the second gear G2 to the input shaft A, causing the second gear G2 to rotate with the input shaft A. The high clutch H may be formed into or mounted on the second gear G2 or mounted independently of the second gear G2. The high clutch H may be, for example, formed into or splined or welded onto or about the input shaft A. The high clutch H and the second gear G2 may be formed together, arranged, or configured as an assembly. The high clutch H may be a wet clutch.

A medium or mid clutch M may be fixedly connected to or mounted on the input shaft A, causing the mid clutch M to rotate with the input shaft A. Alternatively, the high clutch H may be fixedly connected to or mounted on and rotate with the third gear G3. The mid clutch M is selectively engageable. When the mid clutch M is engaged, the mid clutch M releasably connects or fixes the third gear G3 to the input shaft A, causing the third gear G3 to rotate with the input shaft A. The mid clutch M may be formed into or mounted on the third gear G3 or mounted independently of the third gear G3. The mid clutch M may be, for example, formed into or splined or welded onto or about the input shaft A. The mid clutch M and the third gear G3 may be formed together, arranged, or configured as an assembly. The mid clutch M may be a wet clutch.

A low clutch L may be fixedly connected to or mounted on the first counter shaft B, causing the low clutch L to rotate with the first counter shaft B. Alternatively, the high clutch H may be fixedly connected to or mounted on and rotate with the fourth gear G4. The low clutch L is selectively engageable. When the low clutch L is engaged, the low clutch L releasably connects or fixes the fourth gear G4 to the first counter shaft B, causing the fourth gear G4 to rotate with the first counter shaft B. The low clutch L may be formed into or mounted on the fourth gear G4 or mounted independently of the fourth gear G4. The low clutch L may be, for example, formed into or splined or welded onto or about the first counter shaft B. The low clutch L and the fourth gear G4 may be formed together, arranged, or configured as an assembly. The low clutch L may be a wet clutch.

A first speed clutch S1 may be fixedly connected to or mounted on the second counter shaft C, causing the first speed clutch S1 to rotate with the second counter shaft C. Alternatively, the high clutch H may be fixedly connected to or mounted on and rotate with the twelfth gear G12. The first speed clutch S1 is selectively engageable. When the first speed clutch S1 is engaged, the first speed clutch S1 releasably connects or fixes the twelfth gear G12 to the second counter shaft C, causing the twelfth gear G12 to rotate with the second counter shaft C. The first speed clutch S1 may be formed into or mounted on the twelfth gear G12 or mounted independently of the twelfth gear G12. The first speed clutch S1 may be, for example, formed into or splined or welded onto or about the second counter shaft C. The first speed clutch S1 and the twelfth gear G12 may be formed together, arranged, or configured as an assembly. The first speed clutch S1 may be a wet clutch.

A second speed clutch S2 may be fixedly connected to or mounted on the first counter shaft B, causing the second speed clutch S2 to rotate with the first counter shaft B. Alternatively, the high clutch H may be fixedly connected to or mounted on and rotate with the ninth gear G9. The second speed clutch S2 is selectively engageable. When the second speed clutch S2 is engaged, the second speed clutch S2 releasably connects or fixes the ninth gear G9 to the first counter shaft B, causing the ninth gear G9 to rotate with the first counter shaft B. The second speed clutch S2 may be formed into or mounted on the ninth gear G9 or mounted independently of the ninth gear G9. The second speed clutch S2 may be, for example, formed into or splined or welded onto or about the first counter shaft B. The second speed clutch S2 and the ninth gear G9 may be formed together, arranged, or configured as an assembly. The second speed clutch S2 may be a wet clutch.

A third speed clutch S3 may be fixedly connected to or mounted on the first counter shaft B, causing the third speed clutch S3 to rotate with the first counter shaft B. Alternatively, the high clutch H may be fixedly connected to or mounted on and rotate with the seventh gear G7. The third speed clutch S3 is selectively engageable. When the third speed clutch S3 is engaged, the third speed clutch S3 releasably connects or fixes the seventh gear G7 to the first counter shaft B, causing the seventh gear G7 to rotate with the first counter shaft B. The third speed clutch S3 may be formed into or mounted on the seventh gear G7 or mounted independently of the seventh gear G7. The third speed clutch S3 may be, for example, formed into or splined or welded onto or about the first counter shaft B. The third speed clutch S3 and the seventh gear G7 may be formed together, arranged, or configured as an assembly. The third speed clutch S3 may be a wet clutch.

A first range clutch RC1 may be fixedly connected to or mounted on the output shaft D, causing the first range clutch RC1 to rotate with the output shaft D. Alternatively, the high clutch H may be fixedly connected to or mounted on and rotate with the seventeenth gear G17. The first range clutch RC1 is selectively engageable. When the first range clutch RC1 is engaged, the first range clutch RC1 releasably connects or fixes the seventeenth gear G17 to the output shaft D, causing the seventeenth gear G17 to rotate with the output shaft D. The first range clutch RC1 may be formed into or mounted on the seventeenth gear G17 or mounted independently of the seventeenth gear G17. The first range clutch RC1 may be, for example, formed into or splined or welded onto or about the output shaft D. The first range clutch RC1 and the seventeenth gear G17 may be formed together, arranged, or configured as an assembly. The first range clutch RC1 may be a wet clutch.

A second range clutch RC2 may be fixedly connected to or mounted on the output shaft D, causing the second range clutch RC2 to rotate with the output shaft D. Alternatively, the high clutch H may be fixedly connected to or mounted on and rotate with the eighteenth gear G18. The second range clutch RC2 is selectively engageable. When the second range clutch RC2 is engaged, the second range clutch RC2 releasably connects or fixes the eighteenth gear G18 to the output shaft D, causing the eighteenth gear G18 to rotate with the output shaft D. The second range clutch RC2 may be formed into or mounted on the eighteenth gear G18 or mounted independently of the eighteenth gear G18. The second range clutch RC2 may be, for example, formed into or splined or welded onto or about the output shaft D. The second range clutch RC2 and the eighteenth gear G18 may be formed together, arranged, or configured as an assembly. The second range clutch RC2 may be a wet clutch.

A third range clutch RC3 may be fixedly connected to or mounted on the second counter shaft C, causing the third range clutch RC3 to rotate with the second counter shaft C. Alternatively, the high clutch H may be fixedly connected to or mounted on and rotate with the tenth gear G10. The third range clutch RC3 is selectively engageable. When the third range clutch RC3 is engaged, the third range clutch RC3 releasably connects or fixes the tenth gear G10 to the second counter shaft C, causing the tenth gear G10 to rotate with the second counter shaft C. The third range clutch RC3 may be formed into or mounted on the tenth gear G10 or mounted independently of the tenth gear G10. The third range clutch RC3 may be, for example, formed into or splined or welded onto or about the second counter shaft C. The third range clutch RC3 and the tenth gear G10 may be formed together, arranged, or configured as an assembly. The third range clutch RC3 may be a wet clutch.

A reverse clutch R may be fixedly connected to or mounted on the input shaft A, causing the reverse clutch R to rotate with the input shaft A. Alternatively, the reverse clutch R may be fixedly connected to or mounted on and rotate with the reverse drive gear RG1. The reverse clutch R is selectively engageable. When the reverse clutch R is engaged, the reverse clutch R releasably connects or fixes the reverse drive gear RG1 to the input shaft A, causing the reverse drive gear RG1 to rotate with the input shaft A. The reverse clutch R may be formed into or mounted on the reverse drive gear RG1 or mounted independently of the reverse drive gear RG1. The reverse clutch R may be, for example, formed into or splined or welded onto or about the input shaft A. The reverse clutch R and the reverse drive gear RG1 may be formed together, arranged, or configured as an assembly. The reverse clutch R may be a wet clutch.

According to some embodiments, the first gear G1 engages or meshes with the fourth gear G4. The second gear G2 engages or meshes with the sixth gear G6. The third gear G3 engages or meshes with the eighth gear G8. The fifth gear G5 engages or meshes with the twelfth gear G12. The seventh gear G7 engages or meshes with the fourteenth gear G14. The ninth gear G9 engages or meshes with the fifteenth gear G15. The tenth gear G10 engages or meshes with the sixteenth gear G16. The eleventh gear G11 engages or meshes with the seventeenth gear G17. The thirteenth gear G13 engages or meshes with the eighteenth gear G18. The reverse idler gear RG2 engages or meshes with the reverse drive gear RG1 and the reverse driven gear RG3. Each group of these engaged or meshed gears may form a gear pair or set.

Accordingly, engagement of one of the low clutch L, the mid clutch M, or the high clutch H couples the input shaft A and the first counter shaft B. Engagement of one of the first speed clutch S1, the second speed clutch S2, or the third speed clutch S3 couples the first counter shaft B and the second counter shaft C. Engagement of one of the first range clutch RC1, the second range clutch RC2, or the third range clutch RC3 couples the second counter shaft C and the output shaft D.

In other embodiments, any of the clutches may be positioned on the shaft of the other gear in each pair of meshed gears. The gear positioned on the same shaft as the clutch would be rotatably mounted to the shaft and the other gear in the gear pair would be fixedly mounted to the other shaft. For example, the low clutch L may be fixedly mounted on the input shaft A instead of the first counter shaft B. The first gear G1 would then be rotatably mounted on the input shaft A instead of being fixed, and the fourth gear G4 would be fixed on the first counter shaft B instead of rotatably mounted. Engagement of the low clutch L would releasably fix the first gear G1 to the input shaft A having the same effect as when the low clutch L was positioned on the first counter shaft B, which is rotation of the first counter shaft B.

For another example, the third range clutch RC3 may be fixedly mounted on the output shaft D instead of the second counter shaft C. The sixteenth gear G16 would then be rotatably mounted on the output shaft D instead of being fixed, and the tenth gear G10 would be fixed on the second counter shaft C instead of rotatably mounted. Engagement of the third range clutch RC3 would releasably fix the sixteenth gear G16 to the output shaft D having the same effect as when the third range clutch RC3 was positioned on the second counter shaft C, which is rotation of the output shaft D. One or more of the clutches, or all of them, could have this alternate arrangement.

The low clutch L may be positioned on the input shaft A. The mid clutch M may be positioned on the first counter shaft B. The high clutch H may be positioned on the first counter shaft B. The first speed clutch S1 may be positioned on the first counter shaft B. The second speed clutch S2 may be positioned on the second counter shaft C. The third speed clutch S3 may be positioned on the second counter shaft C. The first range clutch RC1 may be positioned on the first counter shaft C. The second range clutch RC3 may be positioned on the first counter shaft C. The third range clutch RC3 may be positioned on the output shaft D. The reverse clutch R may be positioned on the reverse idler shaft RI or the first counter shaft B. Again, the gear positioned on the same shaft as the clutch would then be rotatably mounted to the shaft and the other gear or gears in the gear pair would be fixedly mounted to the other shaft or shafts.

Figure 2:
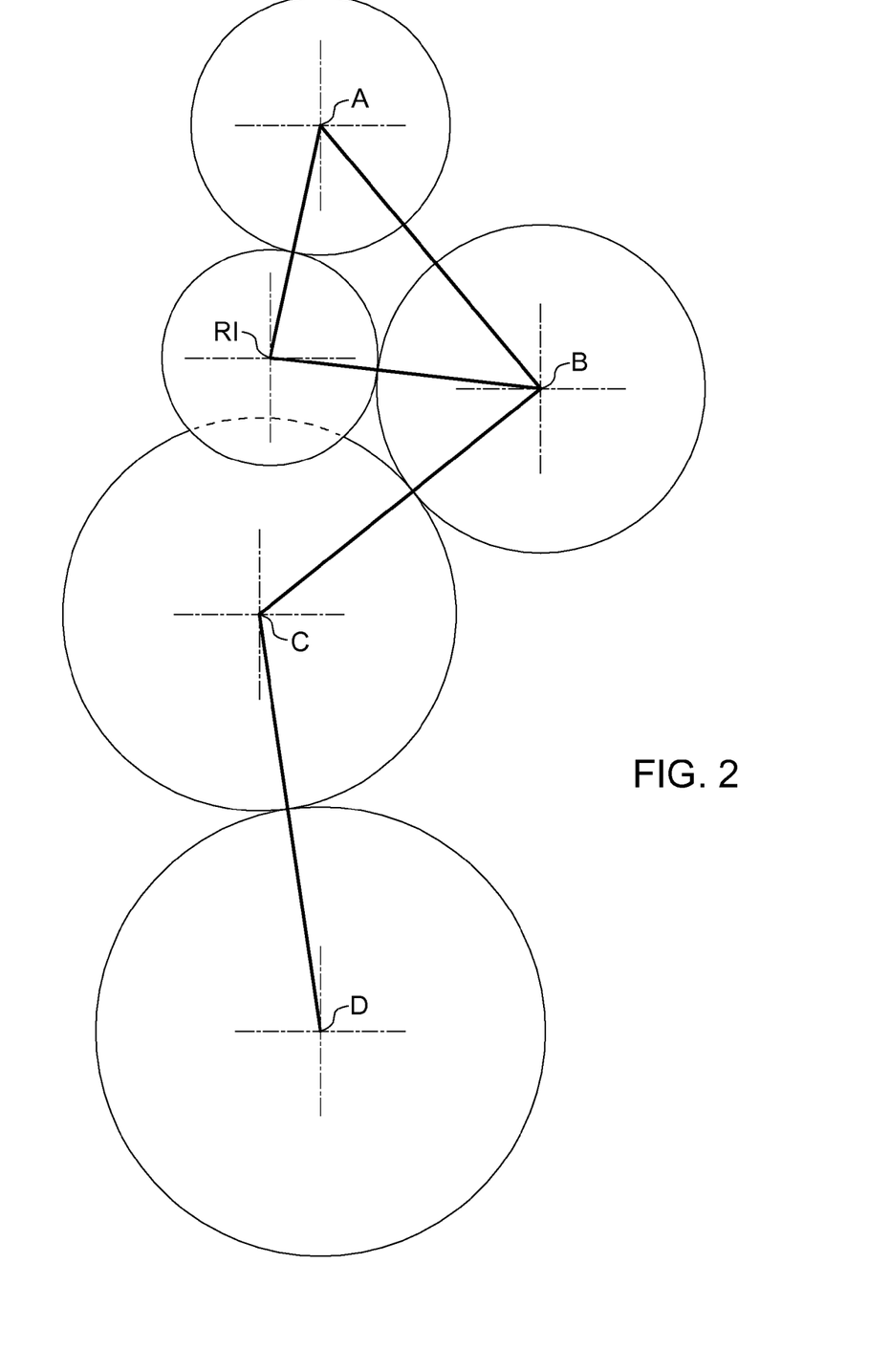
FIG. 2 is a schematic of a powershift transmission, according to one embodiment.

FIG. 2 illustrates the relative position of the transmission shafts in a powershift transmission 100, according to one embodiment. The powershift transmission 100 may include the arrangement of an input shaft A, a first counter shaft B, a second counter shaft C, an output shaft D, and a reverse idler shaft RI in the general configuration as shown.

Figure 3:
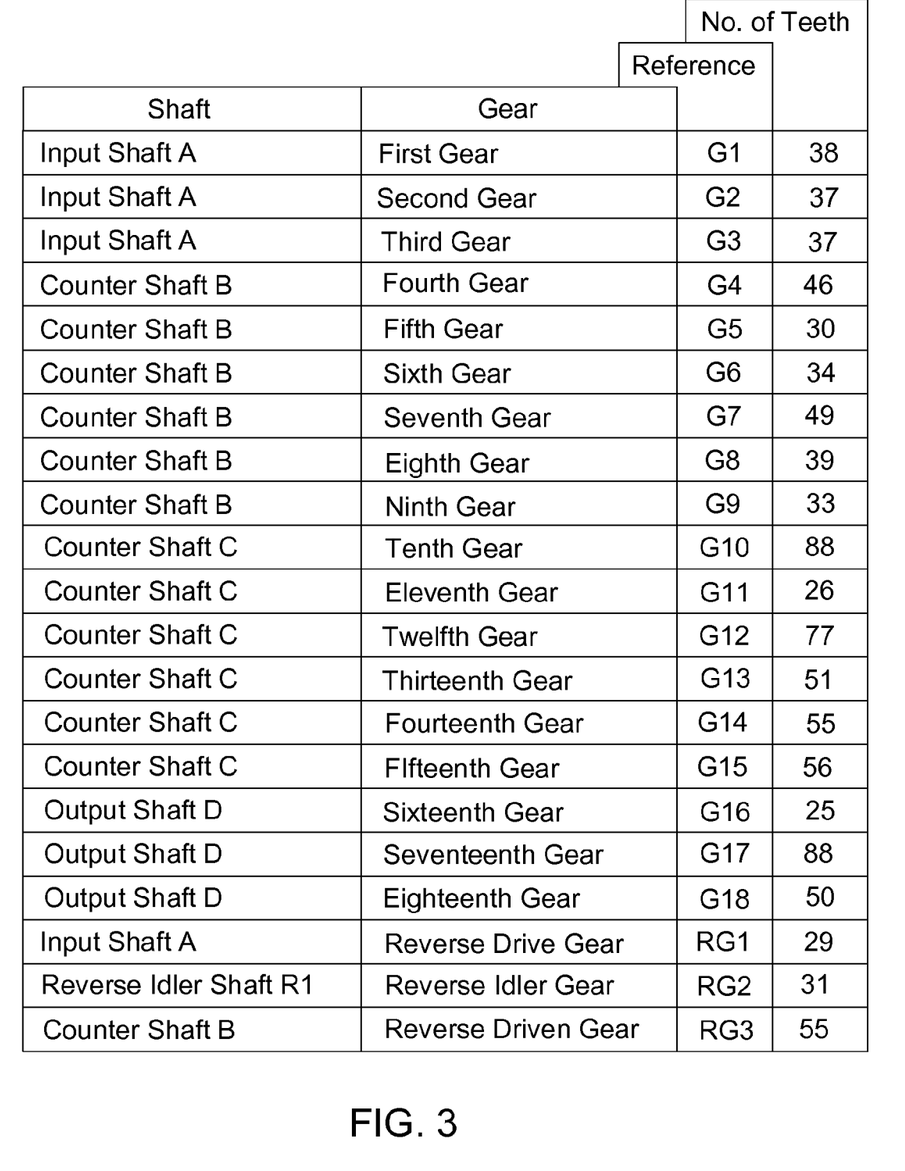
FIG. 3 is a chart identifying the number of teeth on each gear in a powershift transmission, according to one embodiment.

FIG. 3 illustrates a table showing the shaft each gear is positioned on and the number of teeth for each gear, according to one embodiment. In one embodiment, the first gear G1 has 38 teeth; the second gear G2 has 37 teeth; the third gear G3 has 37 teeth; the fourth gear G4 has 46 teeth; the fifth gear G5 has 30 teeth; the sixth gear G6 has 34 teeth; the seventh gear G7 has 49 teeth; the eighth gear G8 has 39 teeth; the ninth gear G9 has 33 teeth; the tenth gear G10 has 88 teeth; the eleventh gear G11 has 26 teeth; the twelfth gear G12 has 77 teeth; the thirteenth gear G13 has 51 teeth; the fourteenth gear G14 has 55 teeth; the fifteenth gear G15 has 56 teeth; the sixteenth gear G16 has 25 teeth; the seventeenth gear G17 has 88 teeth; the eighteenth gear G18 has 50 teeth; the reverse drive gear RG1 has 29 teeth; the reverse idler gear RG2 has 31 teeth; and the reverse driven gear RG3 has 55 teeth. The number of teeth for each gear may vary from the embodiment described above.

The input shaft A may include the first gear G1, the second gear G2, the third gear G3, and the reverse drive gear RG1. The counter shaft B may include the fourth gear G4, the fifth gear G5, the sixth gear G6, the seventh gear G7, the eighth gear G8, the ninth gear G9, and the reverse driven gear RG3. The second counter shaft C may include the tenth gear G10, the eleventh gear G11, the twelfth gear G12, the thirteenth gear G13, the fourteenth gear G14, and the fifteenth gear G15. The output shaft D may include the sixteenth gear G16, the seventeenth gear G17, and the eighteenth gear G18. The reverse idler shaft RI may include the reverse idler gear RG3.

Figure 4:
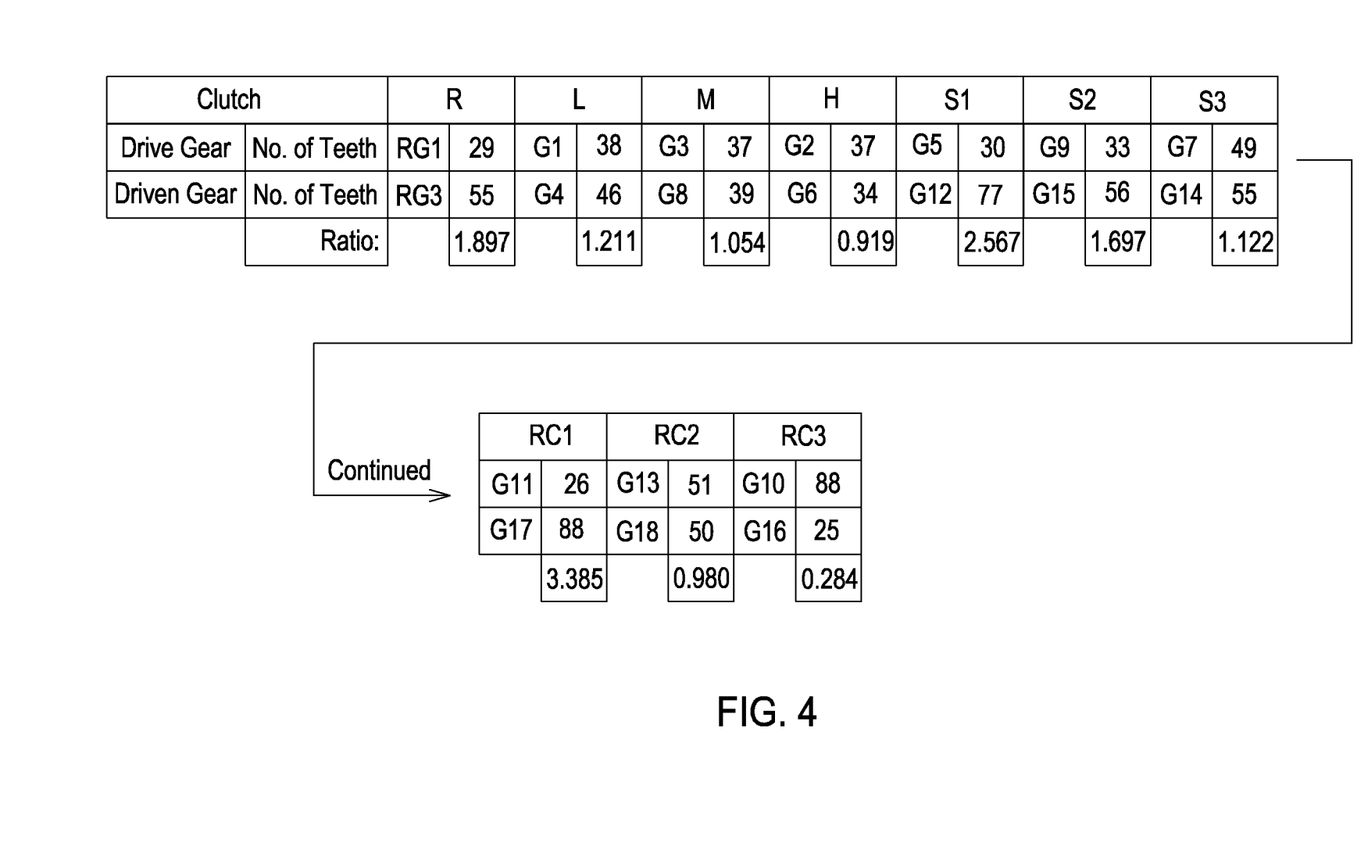
FIG. 4 is a chart identifying the gear ratios for the clutches in a powershift transmission, according to one embodiment.

FIG. 4 illustrates a table showing the gear ratio for each clutch based upon the number of teeth for each gear in the gear pair, according to one embodiment. Each clutch may generate a gear ratio based upon the number of teeth of the driven gear divided by the number of teeth of the drive gear for each gear pair. The number of teeth for each gear in the gear pair may vary and still maintain the same or similar gear ratio. In addition, the number of teeth for each gear may vary such that the gear ratios listed below may vary by up to 1%, 5%, 10%, 15%, or 20%. For each gear ratio, the number of teeth for one gear may vary or the number of teeth for both gears may vary.

The low clutch L may generate a gear ratio of 46/38=1.211, which is the number of teeth on the fourth gear G4 divided by the number of teeth on the first gear G1. The mid clutch M may generate a gear ratio of 39/37=1.054, which is the number of teeth on the eighth gear G8 divided by the number of teeth on the third gear G3. The high clutch H may generate a gear ratio of 34/37=0.919, which is the number of teeth on the sixth gear G6 divided by the number of teeth on the second gear G2.

The first speed clutch S1 may generate a gear ratio of 77/30=2.567, which is the number of teeth on the twelfth gear G12 divided by the number of teeth on the fifth gear G5. The second speed clutch S2 may generate a gear ratio of 56/33=1.697, which is the number of teeth on the fifteenth gear G15 divided by the number of teeth on the ninth gear G9. The third speed clutch S3 may generate a gear ratio of 55/49=1.122, which is the number of teeth on the fourteenth gear G14 divided by the number of teeth on the seventh gear G7.

The first range clutch RC1 may generate a gear ratio of 88/26=3.385, which is the number of teeth on the seventeenth gear G17 divided by the number of teeth on the eleventh gear G11. The second range clutch RC2 may generate a gear ratio of 50/51=0.980, which is the number of teeth on the eighteenth gear G18 divided by the number of teeth on the thirteenth gear G13. The third range clutch RC3 may generate a gear ratio of 25/88=0.284, which is the number of teeth on the sixteenth gear G16 divided by the number of teeth on the tenth gear G10. The reverse clutch R may generate a gear ratio of 46/38=1.897, which is the number of teeth on the reverse driven gear RG3 divided by the number of teeth on the reverse drive gear RG1.

Figure 5:
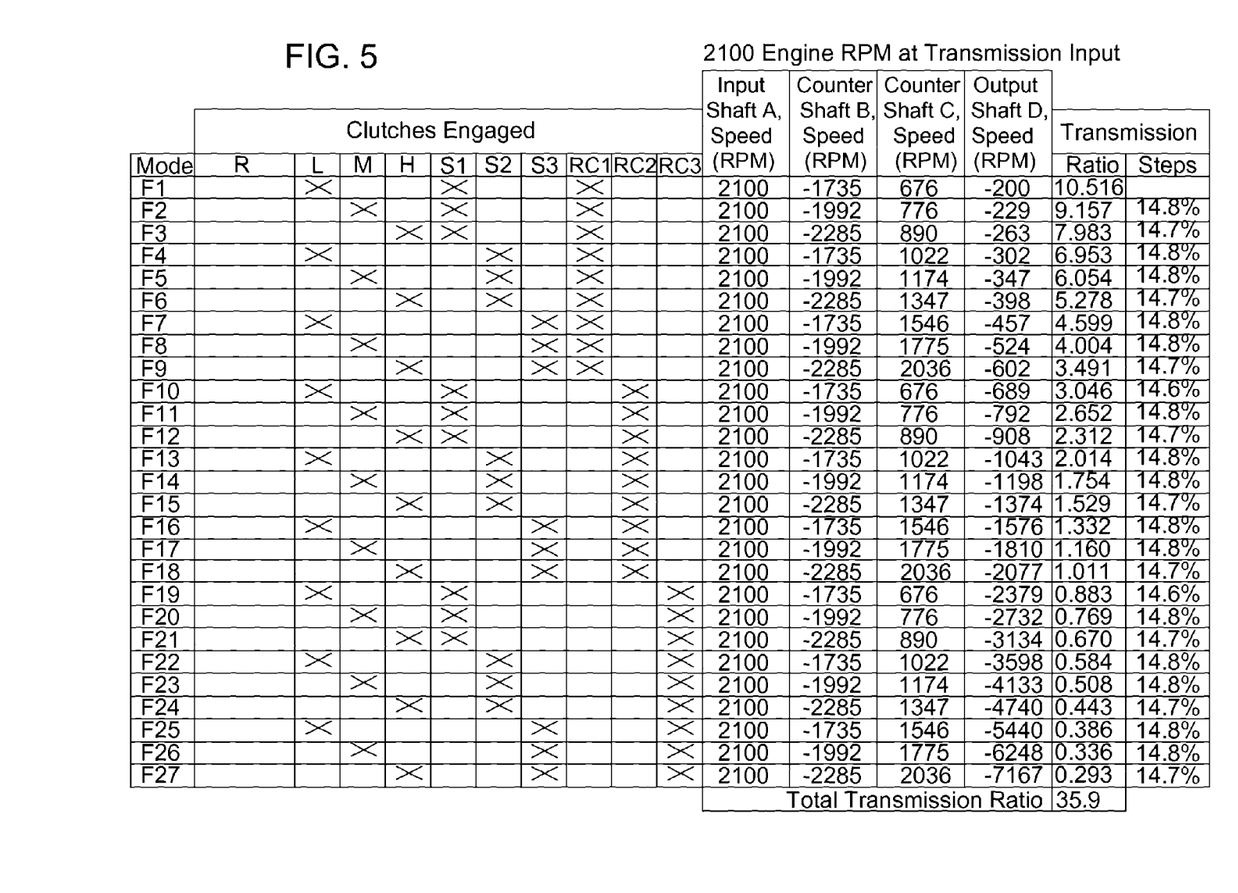
FIG. 5 is a chart identifying the engaged clutches, shaft speeds, and transmission ratios for the forward modes of a powershift transmission, according to one embodiment.

FIG. 5 illustrates the clutches that are engaged for each of the twenty-seven forward modes F1-F27 and the resulting shaft speeds, transmission ratios, and shift steps between the forward modes, according to one embodiment. The shift steps are shown as a percentage changes in the speed of the output shaft D between each forward mode. For example, the shift step between the first forward mode F1 and the second forward mode F2 is the speed of the output shaft D in the second forward mode F2 minus the speed of the output shaft D in the first forward mode F1 divided by the speed of the output shaft D in the first forward mode F1; or, the shift step between the first forward mode F1 and the second forward mode F2 is the transmission ratio of the first forward mode F1 minus the transmission ratio of the second forward mode F2 divided by the transmission ratio of the second forward mode F2 (10.516−9.157)/9.157=14.8%. In some embodiments, the shift step between each forward mode is about 15% or less, or the shift step between each forward mode is less than 15%. The total transmission ratio is the transmission ratio of the first forward mode F1 divided by the transmission ratio of the twenty-seventh forward F27, or about 36 (10.516/0.293=35.9). The total transmission ratio can vary by up to 1%, 5%, 10%, 15%, or 20%.

In some embodiments, for each forward mode F1-F27, one of the low, mid, or high clutches L, M, H is engaged; one of the speed clutches S1, S2, S3 is engaged; and one of the range clutches R1, R2, and R3 is engaged. A first forward mode F1, for example, may include engagement of the low clutch L, the first speed clutch S1, and the first range clutch RC1.

The following description is one embodiment of the first forward mode F1. When the input shaft A is rotating at a speed of 2,100 RPM, for example, engagement of the low clutch L causes the first counter shaft B to rotate at a speed of 1,735 RPM in the opposite direction as input shaft A due to the engagement or meshing of the first gear G1 located on the input shaft A with the fourth gear G4 located on the first counter shaft B. The speed of the first counter shaft B equals the speed of the input shaft A divided by the gear ratio of the low speed clutch L, which is the number of teeth of fourth gear G4 divided by the number of teeth of the first gear G1 (1735 RPM=2,100 RPM÷46/38).

The engagement of the first speed clutch S1 causes the second counter shaft C to rotate at a speed of 676 RPM in the same direction as the input shaft A due to the engagement or meshing of the fifth gear G5 located on the first counter shaft B with the twelfth gear G12 located on the second counter shaft C. The speed of the second counter shaft C equals the speed of the first counter shaft B divided by the gear ratio of the first speed clutch S1, or the number of teeth of the twelfth gear G12 divided by the number of teeth of the fifth gear G5 (676 RPM=1,735 RPM÷77/30).

The engagement of the first range clutch RC1 causes the output shaft D to rotate at a speed of 200 RPM in the opposite direction as input shaft A due to the engagement of the eleventh gear G11 located on the second counter shaft C with the seventeenth gear G17 located on the output shaft D. The speed of the output shaft D equals the speed of the second counter shaft C divided by the gear ratio of the first range clutch RC1, or the number of teeth of the seventeenth gear G17 divided by the number of teeth of the eleventh gear G11 (200 RPM=676 RPM÷88/26). The transmission ratio is 10.516 for the first forward mode F1, which is ratio of the output shaft D speed to the input shaft A speed, or the gear ratio of the low clutch L times the gear ratio of the first speed clutch S1 times the gear ratio of the first range clutch RC1 (46/38×77/30×88/26=10.516). This transmission ratio means that the output shaft D rotates 10.516 times slower than the input shaft A. This same methodology is used to calculate the shaft speeds and transmission ratios for all of the other forward modes.

Figure 6:
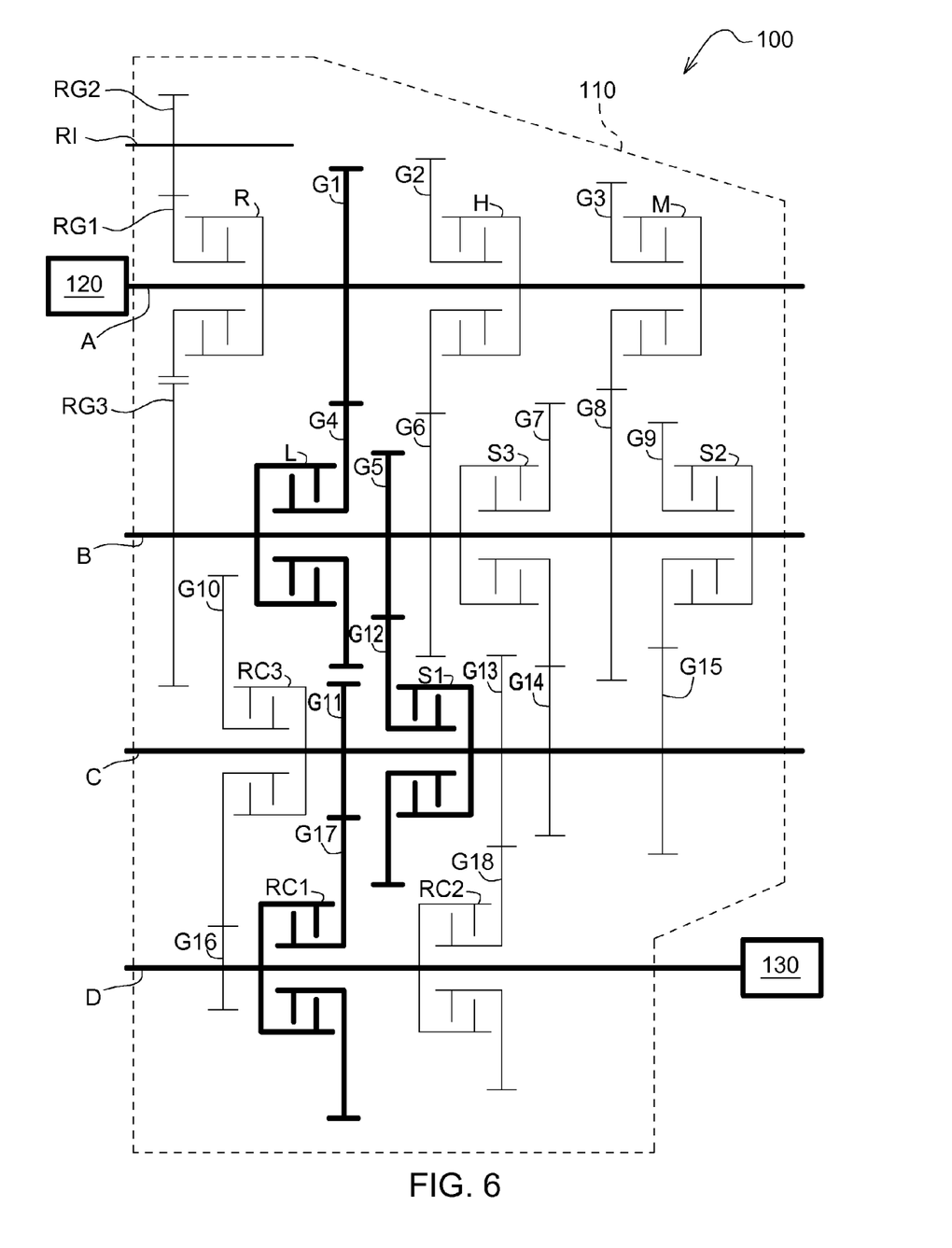
FIG. 6 is a schematic of a powershift transmission illustrating the power flow in a forward mode F1, according to one embodiment.

FIG. 6 illustrates the power flow in the forward mode F1, according to one embodiment. The following description describes one embodiment of the first forward mode F1. The power source 120 is operatively connected to the input shaft A causing the input shaft A to rotate in a first direction. The first gear G1 is fixed to the input shaft A causing the first gear G1 to rotate with the input shaft A in the first direction. The first gear G1 meshes with the fourth gear G4 causing the fourth gear G4 to rotate in a second direction opposite the first direction. Because the low clutch L is engaged, the fourth gear G4 is releasably fixed to the first countershaft B causing the first countershaft B to rotate with the fourth gear G4 in the second direction. The fifth gear G5 is fixed to the first counter shaft B causing the fifth gear G5 to rotate with the first counter shaft B in the second direction.

The fifth gear G5 meshes with the twelfth gear G12 causing the twelfth gear G12 to rotate in the first direction. Because the first speed clutch S1 is engaged, the twelfth gear G12 is releasably fixed to the second counter shaft C causing the second counter shaft C to rotate with the twelfth gear G12 in the first direction. The eleventh gear G11 is fixed to the second counter shaft C causing eleventh gear G11 to rotate with the second counter shaft C in the first direction. The eleventh gear G11 meshes with the seventeenth gear G17 causing the seventeenth gear G17 to rotate in the second direction. Because the first range clutch RC1 is engaged, the seventeenth gear G17 is releasably fixed to the output shaft D causing the output shaft D to rotate with the seventeenth gear G17 in the second direction. The output shaft D is operatively connected to the final drive 130 causing the final drive 130 to rotate.

The rotation of the input shaft A also causes the reverse clutch R, the high clutch H, and the mid clutch M to rotate because they are fixed to the input shaft A. The rotation of the input shaft A does not affect the rotation of the second gear G2 because the high clutch H is disengaged. The rotation of the input shaft A does not affect the rotation of the third gear G3 because the mid clutch M is disengaged. The rotation of the input shaft A does not affect the rotation of the reverse drive gear RG1 because the reverse clutch R is disengaged.

The rotation of the first counter shaft B also causes the reverse driven gear RG3, the sixth gear G6, the eighth gear G8, the third speed clutch S3, and the second speed clutch S2 to rotate because they are fixed to the first counter shaft B. The rotation of the reverse driven gear RG3 causes the reverse idler gear RG2 and the reverse idler shaft RI to rotate, which then causes the reverse drive gear RG1 to rotate. The rotation of the first counter shaft B does not affect the rotation of the seventh gear G7 because the third speed clutch S3 is disengaged. The rotation of the first counter shaft B does not affect the rotation of the ninth gear G9 because the second speed clutch S2 is disengaged.

The rotation of the second counter shaft C also causes the thirteenth gear G13, the fourteenth gear G14, the fifteenth gear G15, and the third range clutch RC3 to rotate because they are fixed to the second counter shaft C. The rotation of the second counter shaft C does not affect the rotation of the tenth gear G10 because the third range clutch RC3 is disengaged.

The rotation of the output shaft D also causes the sixteenth gear G16 and the second range clutch RC2 rotate because they are fixed to the output shaft D. The rotation of the output shaft D does not affect the rotation of the eighteenth gear G18 because the second range clutch RC2 is disengaged.

Thus, in the first forward mode F1, no power is transferred through the second gear G2, the third gear G3, the seventh gear G7, the ninth gear G9, the tenth gear G10, the eighteenth gear G18, and the reverse drive gear RG1 because the high clutch H, the mid clutch M, the second speed clutch S2, the third speed clutch S3, the second range clutch RC2, the third range clutch RC3, and the reverse clutch R are all disengaged. Although all of these gears rotate because each of them is meshed with a gear that is fixed to a rotating shaft, these gears rotate independently of the shafts they are rotatably mounted on due to the respective disengaged clutches. For example, the second gear G2 rotates because it is meshed with the sixth gear G6, which rotates because it is fixed to the rotating first counter shaft B. However, because the high clutch H is disengaged, the second gear G2 rotates independently of the input shaft A.

Figure 7:
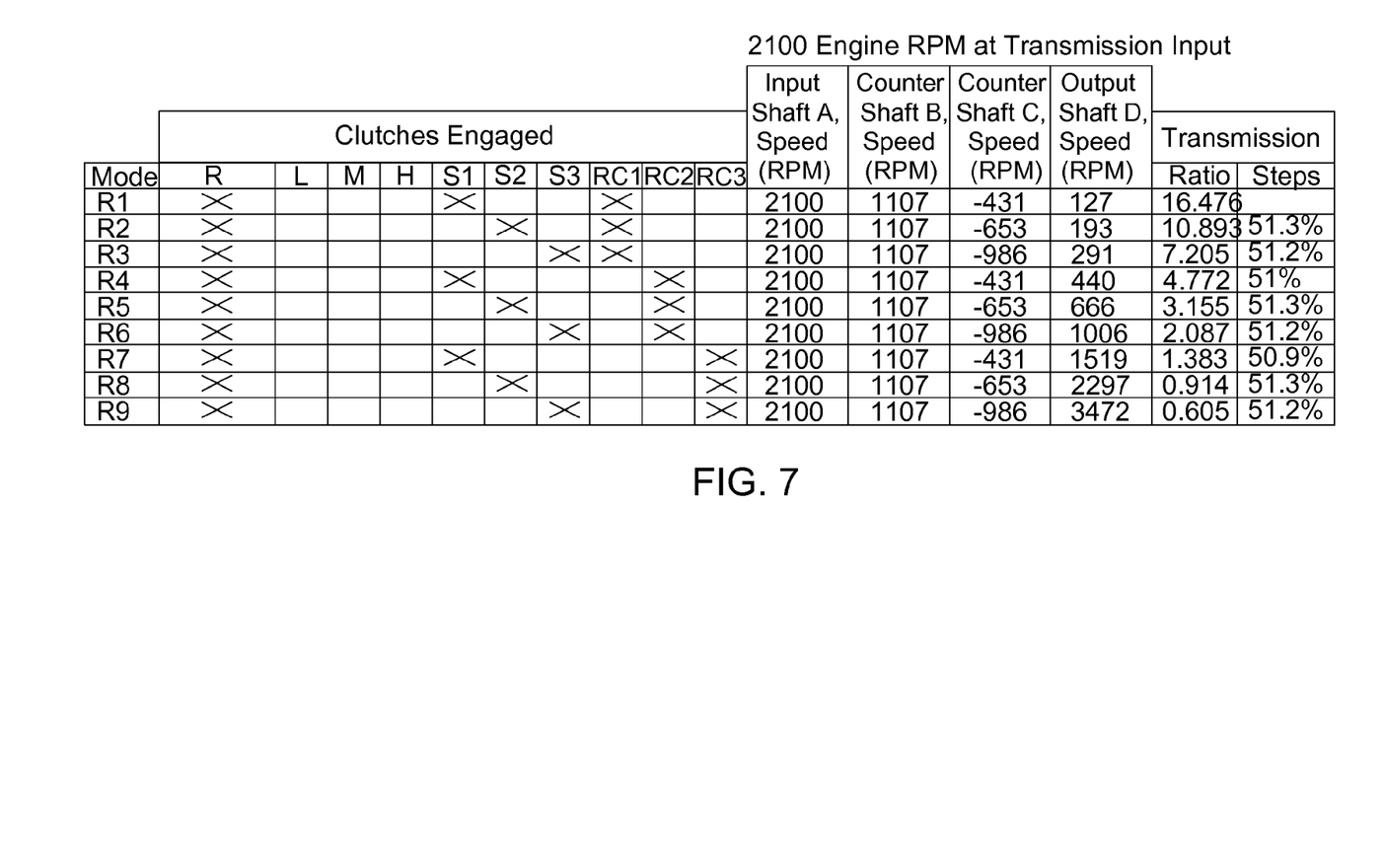
FIG. 7 is a chart identifying the engaged clutches, shaft speeds, and transmission ratios for the reverse modes of a powershift transmission, according to one embodiment.

FIG. 7 illustrates the clutches that are engaged for each of the nine reverse modes R1-R9 and the resulting shaft speeds, transmission ratios, and shift steps between the reverse modes, according to one embodiment. The shift steps are shown as a percentage change in the speed of the output shaft D between each reverse mode, or the percentage changes in the transmission ratio between each reverse mode. In one embodiment, the shift step between each reverse mode is about 50% or 51%. In some embodiments, for each reverse mode R1-R9, the reverse clutch R is engaged; one of the speed clutches S1, S2, S3 is engaged; and one of the range clutches R1, R2, and R3 is engaged. A first reverse mode R1, for example, may include the engagement of the reverse clutch R, the first speed clutch S1, and the first range clutch RC1.

The following description is one embodiment of the first reverse mode R1. When the input shaft A is rotating at a speed of 2,100 RPM, for example, engagement of the reverse clutch R causes the first counter shaft B to rotate at a speed of 1,107 RPM in the same direction as input shaft A due to the engagement or meshing of the reverse idler gear RG2 located on the reverse idler shaft RI with both the reverse driven gear RG1 located on the input shaft A and the reverse driven gear RG3 on the first counter shaft B. The reverse idler gear RG2 and the reverse idler shaft RI rotate together in the opposite direction as the reverse drive gear RG1, the input shaft A, the reverse driven gear RG2, and the counter shaft B. The speed of the first counter shaft B equals the speed of the input shaft A divided by the gear ratio of the reverse clutch R, which is the number of teeth of the reverse driven gear RG3 divided by the number of teeth of the reverse drive gear RG1 (1,107 RPM=2,100 RPM÷55/29).

The engagement of the first speed clutch S1 causes the second counter shaft C to rotate at a speed of 431 RPM in the opposite direction as the input shaft A due to the engagement or meshing of the fifth gear G5 located on the first counter shaft B with the twelfth gear G12 located on the second counter shaft C. The speed of the second counter shaft C equals the speed of the first counter shaft B divided by the gear ratio of the first speed clutch S1, or the number of teeth of the twelfth gear G12 divided by the number of teeth of the fifth gear G5 (431 RPM=1,107 RPM÷77/30).

The engagement of the first range clutch RC1 causes the output shaft D to rotate at a speed of 127 RPM in the same direction as input shaft A due to the engagement of the eleventh gear G11 located on the second counter shaft C with the seventeenth gear G17 located on the output shaft D. The speed of the output shaft D equals the speed of the second counter shaft C divided by the gear ratio of the first range clutch RC1, or the number of teeth of the seventeenth gear G17 divided by the number of teeth of the eleventh gear G11 (127 RPM=431 RPM÷88/26). The transmission ratio is then 16.476, which is ratio of the output shaft D speed to the input shaft A speed, or the gear ratio of the reverse clutch R times the gear ratio of the first speed clutch S1 times the gear ratio of the first range clutch RC1 (55/29×77/30×88/26=16.476). This transmission ratio means that the output shaft D rotates 16.476 times slower than the input shaft A. The same methodology is used to calculate the shaft speeds and transmission ratios for the other reverse modes.

Figure 8:
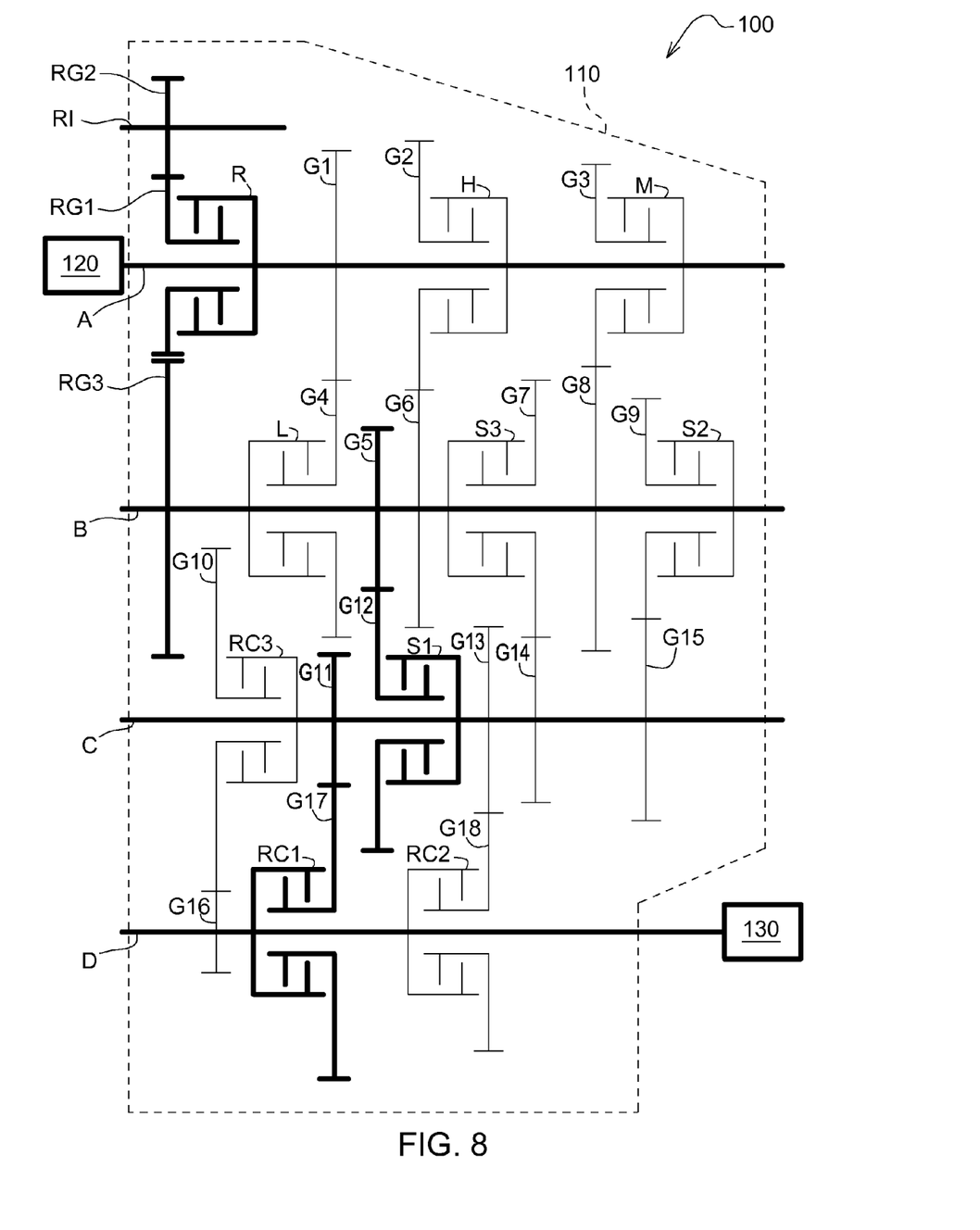
FIG. 8 is a schematic of a powershift transmission illustrating the power flow in a reverse mode R1, according to one embodiment.

FIG. 8 illustrates the power flow in the reverse mode R1, according to one embodiment. The following description describes one embodiment of the first reverse mode R1. The power source 120 is operatively connected to the input shaft A causing the input shaft A to rotate in a first direction. Because the reverse clutch R is engaged, the reverse drive gear RG1 is releasably fixed to the input shaft A causing the reverse drive gear RG1 to rotate with the input shaft A in the first direction. The reverse drive gear RG1 meshes with the reverse idler gear RG2 causing the reverse idler gear RG2 to rotate in a second direction opposite the first direction. The reverse idler gear RG2 is fixed to the reverse idler shaft RI causing the reverse idler shaft RI to rotate with the reverse idler gear RG2 in the second direction. The reverse idler gear RG2 meshes with the reverse driven gear RG3 causing the reverse driven gear RG3 to rotate in the first direction. The reverse driven gear RG3 is fixed to the first counter shaft B causing the first counter shaft B to rotate with the reverse driven gear RG3 in the first direction.

The fifth gear G5 is fixed to the first counter shaft B causing the fifth gear G5 to rotate with the first counter shaft B in the first direction. The fifth gear G5 meshes with the twelfth gear G12 causing the twelfth gear G12 to rotate in the second direction. Because the first speed clutch S1 is engaged, the twelfth gear G12 is releasably fixed to the second counter shaft C causing the second counter shaft C to rotate with the twelfth gear G12 in the second direction. The eleventh gear G11 is fixed to the second counter shaft C causing eleventh gear G11 to rotate with the second counter shaft C in the second direction. The eleventh gear G11 meshes with the seventeenth gear G17 causing the seventeenth gear G17 to rotate in the first direction. Because the first range clutch RC1 is engaged, the seventeenth gear G17 is releasably fixed to the output shaft D causing the output shaft D to rotate with the seventeenth gear G17 in the first direction. The output shaft D is operatively connected to the final drive 130 causing the final drive 130 to rotate.

The rotation of the input shaft A also causes the first gear G1, the high clutch H, and the mid clutch M to rotate because they are fixed to the input shaft A. The rotation of the input shaft A does not affect the rotation of the second gear G2 because the high clutch H is disengaged. The rotation of the input shaft A does not affect the rotation of the third gear G3 because the mid clutch M is disengaged.

The rotation of the first counter shaft B also causes the sixth gear G6, the eighth gear G8, the low clutch L, the second speed clutch S2, and the third speed clutch S3 to rotate because they are fixed to the first counter shaft B. The rotation of the first counter shaft B does not affect the rotation of the fourth gear G4 because the low clutch L is disengaged. The rotation of the first counter shaft B does not affect the rotation of the seventh gear G7 because the third speed clutch S3 is disengaged. The rotation of the first counter shaft B does not affect the rotation of the ninth gear G9 because the second speed clutch S2 is disengaged.

The rotation of the second counter shaft C also causes the thirteenth gear G13, the fourteenth gear G14, the fifteenth gear G15, and the third range clutch RC3 to rotate because they are fixed to the second counter shaft C. The rotation of the second counter shaft C does not affect the rotation of the tenth gear G10 because the third range clutch RC3 is disengaged.

The rotation of the output shaft D also causes the sixteenth gear G16 and the second range clutch RC2 rotate because they are fixed to the output shaft D. The rotation of the output shaft D does not affect the rotation of the eighteenth gear G18 because the second range clutch RC2 is disengaged.

Thus, in the first reverse mode, no power is transferred through the second gear G2, the third gear G3, the fourth gear G4, the seventh gear G7, the ninth gear G9, the tenth gear G10, and the eighteenth gear G18 because the high clutch H, mid clutch M, low clutch L, second speed clutch S2, third speed clutch S3, second range clutch RC2, and third range clutch RC3 are all disengaged. Although all of these gears rotate because each of them is meshed with a gear that is fixed to a rotating shaft, these gears rotate independently of the shafts they are rotatably mounted on due to the respective disengaged clutches. For example, the eighteenth gear G18 rotates because it meshes with the thirteenth gear G13, which rotates because it is fixed to the rotating second counter shaft C. However, the eighteenth gear G18 rotates independently of the output shaft D because the second range clutch RC2 is disengaged.

Without in any way limiting the scope, interpretation, or application of the claims appearing below, a technical effect of one or more of the example embodiments disclosed herein is a powershift transmission utilizing a minimum number of components and still being highly functional and versatile. Another technical effect of one or more of the example embodiments disclosed herein is a powershift transmission having a large overall transmission ratio of about 36:1 to propel a vehicle effectively at both low and high speeds. Another technical effect of one or more of the example embodiments disclosed herein is a powershift transmission having shift steps between the forward modes of about 15% or less. These small shift steps between the forward modes promote smooth mode changes and enhance operator comfort when increasing or decreasing the forward mode. Another technical effect of one or more of the example embodiments disclosed herein is a powershift transmission utilizing eighteen gears and nine clutches to generate twenty-seven forward modes. This reduces the number of parts required to produce the powershift transmission, which minimizes production costs. Another technical effect of one or more of the example embodiments disclosed herein is a powershift transmission utilizing an additional three gears and one clutch to generate nine reverse modes.

The terminology used herein is for the purpose of describing particular implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

While the above describes example embodiments of the present disclosure, these descriptions should not be viewed in a restrictive or limiting sense. Rather, there are several variations and modifications which may be made without departing from the scope of the appended claims.

What is claimed is:

1. A powershift transmission comprising:
   a transmission housing;
   an input shaft, a first counter shaft, a second counter shaft, and an output shaft rotatably connected to the transmission housing;
   a plurality of gears and a plurality of clutches arranged on the shafts resulting in twenty-seven forward modes;
   wherein the plurality of gears comprises:
      a first gear, a second gear, and a third gear operably connected to the input shaft;
      a fourth gear, a fifth gear, a sixth gear, a seventh gear, an eighth gear, and a ninth gear operably connected to the first counter shaft, the first gear engaged with the fourth gear, the second gear engaged with the sixth gear, the third gear engaged with the eighth gear;
      a tenth gear, an eleventh gear, a twelfth gear, a thirteenth gear, a fourteenth gear, and a fifteenth gear operably connected to the second counter shaft, the twelfth gear engaged with the fifth gear, the fourteenth gear engaged with the seventh gear, and the fifteenth gear engaged with the ninth gear; and
      a sixteenth gear, a seventeenth gear, and an eighteenth gear operably connected to the output shaft, the sixteenth gear engaged with the tenth gear, the seventeenth gear engaged with the eleventh gear, the eighteenth gear engaged with the thirteenth gear;
   wherein:
      the number of teeth on the fourth gear divided by the number of teeth on the first gear is within twenty percent of 1.211;
      the number of teeth on the eighth gear divided by the number of teeth on the third gear is within twenty percent of 1.054;
      the number of teeth on the sixth gear divided by the number of teeth on the second gear is within twenty percent of 0.919;
      the number of teeth on the twelfth gear divided by the number of teeth on the fifth gear is within twenty percent of 2.567;
      the number of teeth on the fifteenth gear divided by the number of teeth on the ninth gear is within twenty percent of 1.697;
      the number of teeth on the fourteenth gear divided by the number of teeth on the seventh gear is within twenty percent of 1.122;
      the number of teeth on the seventeenth gear divided by the number of teeth on the eleventh gear is within twenty percent of 3.385;
      the number of teeth on the eighteenth gear divided by the number of teeth on the thirteenth gear is within twenty percent of 0.980; and
      the number of teeth on the sixteenth gear divided by the number of teeth on the tenth gear is within twenty percent of 0.284.

2. A powershift transmission comprising:
   a transmission housing;
   an input shaft, a first counter shaft, a second counter shaft, and an output shaft rotatably connected to the transmission housing;
   a plurality of gears and a plurality of clutches arranged on the shafts resulting in twenty-seven forward modes;
   wherein the plurality of gears comprises:
      a first gear, a second gear, and a third gear operably connected to the input shaft;
      a fourth gear, a fifth gear, a sixth gear, a seventh gear, an eighth gear, and a ninth gear operably connected to the first counter shaft, the first gear engaged with the fourth gear, the second gear engaged with the sixth gear, the third gear engaged with the eighth gear;
      a tenth gear, an eleventh gear, a twelfth gear, a thirteenth gear, a fourteenth gear, and a fifteenth gear operably connected to the second counter shaft, the twelfth gear engaged with the fifth gear, the fourteenth gear engaged with the seventh gear, and the fifteenth gear engaged with the ninth gear; and
      a sixteenth gear, a seventeenth gear, and an eighteenth gear operably connected to the output shaft, the sixteenth gear engaged with the tenth gear, the seventeenth gear engaged with the eleventh gear, the eighteenth gear engaged with the thirteenth gear;

wherein the plurality of clutches comprises:

a low clutch selectively engageable, such that engagement of the low clutch causes the first counter shaft to rotate relative to the input shaft based upon the engagement between the first gear and the fourth gear;

a mid clutch selectively engageable, such that engagement of the mid clutch causes the first counter shaft to rotate relative to the input shaft based upon the engagement between the third gear and the eighth gear;

a high clutch selectively engageable, such that engagement of the high clutch causes the first counter shaft to rotate relative to the input shaft based upon the engagement between the second gear and the sixth gear;

a first speed clutch selectively engageable, such that engagement of the first speed clutch causes the second counter shaft to rotate relative to the first counter shaft based upon the engagement between the fifth gear and the twelfth gear;

a second speed clutch selectively engageable, such that engagement of the second speed clutch causes the second counter shaft to rotate relative to the first counter shaft based upon the engagement between the ninth gear and the fifteenth gear;

a third speed clutch selectively engageable, such that engagement of the third speed clutch causes the second counter shaft to rotate relative to the first counter shaft based upon the engagement between the seventh gear and the fourteenth gear;

a first range clutch selectively engageable, such that engagement of the first range clutch causes the output shaft to rotate relative to the second counter shaft based upon the engagement between the eleventh gear and the seventeenth gear;

a second range clutch selectively engageable, such that engagement of the second range clutch causes the output shaft to rotate relative to the second counter shaft based upon the engagement between the thirteenth gear and the eighteen gear; and a third range clutch selectively engageable, such that engagement of the third range clutch causes the output shaft to rotate relative to the second counter shaft based upon the engagement between the tenth gear and the sixteen gear;

wherein each forward mode includes the engagement of one of the low clutch, mid clutch, or high clutch; one of the first speed clutch, second speed clutch, or third speed clutch; and one of the first range clutch, second range clutch, or third range clutch.

3. A powershift transmission comprising:

a transmission housing;

an input shaft, a first counter shaft, a second counter shaft, and an output shaft rotatably connected to the transmission housing;

a plurality of gears and a plurality of clutches arranged on the shafts resulting in twenty-seven forward modes;

wherein the plurality of gears comprises:

a first gear, a second gear, and a third gear operably connected to the input shaft;

a fourth gear, a fifth gear, a sixth gear, a seventh gear, an eighth gear, and a ninth gear operably connected to the first counter shaft, the first gear engaged with the fourth gear, the second gear engaged with the sixth gear, the third gear engaged with the eighth gear;

a tenth gear, an eleventh gear, a twelfth gear, a thirteenth gear, a fourteenth gear, and a fifteenth gear operably connected to the second counter shaft, the twelfth gear engaged with the fifth gear, the fourteenth gear engaged with the seventh gear, and the fifteenth gear engaged with the ninth gear; and a sixteenth gear, a seventeenth gear, and an eighteenth gear operably connected to the output shaft, the sixteenth gear engaged with the tenth gear, the seventeenth gear engaged with the eleventh gear, the eighteenth gear engaged with the thirteenth gear;

wherein the plurality of clutches comprises:

a low clutch selectively engageable, such that engagement of the low clutch causes the first counter shaft to rotate relative to the input shaft based upon the engagement between the first gear and the fourth gear;

a mid clutch selectively engageable, such that engagement of the mid clutch causes the first counter shaft to rotate relative to the input shaft based upon the engagement between the third gear and the eighth gear;

a high clutch selectively engageable, such that engagement of the high clutch causes the first counter shaft to rotate relative to the input shaft based upon the engagement between the second gear and the sixth gear;

a first speed clutch selectively engageable, such that engagement of the first speed clutch causes the second counter shaft to rotate relative to the first counter shaft based upon the engagement between the fifth gear and the twelfth gear;

a second speed clutch selectively engageable, such that engagement of the second speed clutch causes the second counter shaft to rotate relative to the first counter shaft based upon the engagement between the ninth gear and the fifteenth gear;

a third speed clutch selectively engageable, such that engagement of the third speed clutch causes the second counter shaft to rotate relative to the first counter shaft based upon the engagement between the seventh gear and the fourteenth gear;

a first range clutch selectively engageable, such that engagement of the first range clutch causes the output shaft to rotate relative to the second counter shaft based upon the engagement between the eleventh gear and the seventeenth gear;

a second range clutch selectively engageable, such that engagement of the second range clutch causes the output shaft to rotate relative to the second counter shaft based upon the engagement between the thirteenth gear and the eighteen gear; and a third range clutch selectively engageable, such that engagement of the third range clutch causes the output shaft to rotate relative to the second counter shaft based upon the engagement between the tenth gear and the sixteen gear;

further comprising:

a reverse idler shaft rotatably connected to the transmission housing; and one or more additional gears and an additional clutch arranged on the shafts resulting in nine reverse modes.

4. The powershift transmission of claim 3, wherein:

the one or more additional gears comprise:

a reverse drive gear operably connected to the input shaft;
a reverse driven gear operably connected to the first counter shaft; and
a reverse idler gear operably connected to the reverse idler shaft, the reverse idler gear engaged with the reverse drive gear and the reverse driven gear;
and the additional clutch comprises:
a reverse clutch selectively engageable, such that engagement of the reverse clutch causes the first counter shaft to rotate relative to the input shaft based upon the engagement between the reverse drive gear, the reverse idler gear, and the reverse driven gear.

5. The powershift transmission of claim 4, wherein each reverse mode includes the engagement of the reverse clutch; one of the first speed clutch, second speed clutch, or third speed clutch; and one of the first range clutch, second range clutch, or third range clutch.

6. A powershift transmission comprising:
a transmission housing;
an input shaft rotatably connected to the transmission housing;
a first gear fixedly connected to the input shaft;
a second gear rotatably connected to the input shaft;
a third gear rotatably connected to the input shaft;
a high clutch selectively engageable with the second gear such that engagement of the high clutch causes the second gear to rotate with the input shaft;
a mid clutch selectively engageable with the third gear such that engagement of the mid clutch causes the third gear to rotate with the input shaft;
a first counter shaft rotatably connected to the transmission housing;
a fourth gear rotatably connected to the first counter shaft, the fourth gear engaged with the first gear;
a fifth gear fixedly connected to the first counter shaft;
a sixth gear fixedly connected to the first counter shaft, the sixth gear engaged with the second gear;
a seventh gear rotatably connected to the first counter shaft;
an eighth gear fixedly connected to the first counter shaft, the eighth gear engaged with the third gear;
a ninth gear rotatably connected to the first counter shaft;
a low clutch selectively engageable, such that engagement of the low clutch causes the fourth gear to rotate with the first counter shaft;
a third speed clutch selectively engageable, such that engagement of the third speed clutch causes the seventh gear to rotate with the first counter shaft;
a second speed clutch selectively engageable, such that engagement of the second speed clutch causes the ninth gear to rotate with the first counter shaft;
a second counter shaft rotatably connected to the transmission housing;
a tenth gear rotatably connected to the second counter shaft;
an eleventh gear fixedly connected to the second counter shaft;
a twelfth gear rotatably connected to the second counter shaft, the twelfth gear engaged with the fifth gear;
a thirteenth gear fixedly connected to the second counter shaft;
a fourteenth gear fixedly connected to the second counter shaft, the fourteenth gear engaged with the seventh gear;
a fifteenth gear fixedly connected to the second counter shaft, the fifteenth gear engaged with the ninth gear;
a third range clutch selectively engageable, such that engagement of the third range clutch causes the tenth gear to rotate with the second counter shaft;
a first speed clutch selectively engageable, such that engagement of the first speed clutch causes the twelfth gear to rotate with the second counter shaft;
an output shaft rotatably connected to the transmission housing;
a sixteenth gear fixedly connected to the output shaft, the sixteenth gear engaged with the tenth gear;
a seventeenth gear rotatably connected to the output shaft, the seventeenth gear engaged with the eleventh gear;
an eighteenth gear rotatably connected to the output shaft, the eighteenth gear engaged with the thirteenth gear;
a first range clutch selectively engageable, such that engagement of the first range clutch causes the seventeenth gear to rotate with the output shaft; and
a second range clutch selectively engageable, such that engagement of the second range clutch causes the eighteenth gear to rotate with the output shaft;
wherein:
the number of teeth on the fourth gear divided by the number of teeth on the first gear is within twenty percent of 1.211;
the number of teeth on the eighth gear divided by the number of teeth on the third gear is within twenty percent of 1.054;
the number of teeth on the sixth gear divided by the number of teeth on the second gear is within twenty percent of 0.919;
the number of teeth on the twelfth gear divided by the number of teeth on the fifth gear is within twenty percent of 2.567;
the number of teeth on the fifteenth gear divided by the number of teeth on the ninth gear is within twenty percent of 1.697;
the number of teeth on the fourteenth gear divided by the number of teeth on the seventh gear is within twenty percent of 1.122;
the number of teeth on the seventeenth gear divided by the number of teeth on the eleventh gear is within twenty percent of 3.385;
the number of teeth on the eighteenth gear divided by the number of teeth on the thirteenth gear is within twenty percent of 0.980; and
the number of teeth on the sixteenth gear divided by the number of teeth on the tenth gear is within twenty percent of 0.284.

7. A powershift transmission comprising:
a transmission housing;
an input shaft rotatably connected to the transmission housing;
a first gear fixedly connected to the input shaft;
a second gear rotatably connected to the input shaft;
a third gear rotatably connected to the input shaft;
a high clutch selectively engageable with the second gear such that engagement of the high clutch causes the second gear to rotate with the input shaft;
a mid clutch selectively engageable with the third gear such that engagement of the mid clutch causes the third gear to rotate with the input shaft;
a first counter shaft rotatably connected to the transmission housing;
a fourth gear rotatably connected to the first counter shaft, the fourth gear engaged with the first gear;

a fifth gear fixedly connected to the first counter shaft;
a sixth gear fixedly connected to the first counter shaft, the sixth gear engaged with the second gear;
a seventh gear rotatably connected to the first counter shaft;
an eighth gear fixedly connected to the first counter shaft, the eighth gear engaged with the third gear;
a ninth gear rotatably connected to the first counter shaft;
a low clutch selectively engageable, such that engagement of the low clutch causes the fourth gear to rotate with the first counter shaft;
a third speed clutch selectively engageable, such that engagement of the third speed clutch causes the seventh gear to rotate with the first counter shaft;
a second speed clutch selectively engageable, such that engagement of the second speed clutch causes the ninth gear to rotate with the first counter shaft;
a second counter shaft rotatably connected to the transmission housing;
a tenth gear rotatably connected to the second counter shaft;
an eleventh gear fixedly connected to the second counter shaft;
a twelfth gear rotatably connected to the second counter shaft, the twelfth gear engaged with the fifth gear;
a thirteenth gear fixedly connected to the second counter shaft;
a fourteenth gear fixedly connected to the second counter shaft, the fourteenth gear engaged with the seventh gear;
a fifteenth gear fixedly connected to the second counter shaft, the fifteenth gear engaged with the ninth gear;
a third range clutch selectively engageable, such that engagement of the third range clutch causes the tenth gear to rotate with the second counter shaft;
a first speed clutch selectively engageable, such that engagement of the first speed clutch causes the twelfth gear to rotate with the second counter shaft;
an output shaft rotatably connected to the transmission housing;
a sixteenth gear fixedly connected to the output shaft, the sixteenth gear engaged with the tenth gear;
a seventeenth gear rotatably connected to the output shaft, the seventeenth gear engaged with the eleventh gear;
an eighteenth gear rotatably connected to the output shaft, the eighteenth gear engaged with the thirteenth gear;
a first range clutch selectively engageable, such that engagement of the first range clutch causes the seventeenth gear to rotate with the output shaft;
a second range clutch selectively engageable, such that engagement of the second range clutch causes the eighteenth gear to rotate with the output shaft;
a reverse idler shaft rotatably connected to the transmission housing;
a reverse drive gear rotatably connected to the input shaft;
a reverse driven gear fixedly connected to the first counter shaft;
a reverse idler gear fixedly connected to the reverse idler shaft, the reverse idler gear engaged with the reverse drive gear and the reverse driven gear; and
a reverse clutch selectively engageable, such that engagement of the reverse clutch causes the reverse drive gear to rotate with the input shaft.

8. The powershift transmission of claim 7, wherein the powershift transmission includes a plurality of reverse modes and each reverse mode includes the engagement of the reverse clutch; one of the first speed clutch, second speed clutch, or third speed clutch; and one of the first range clutch, second range clutch, or third range clutch.

9. The powershift transmission of claim 7, wherein the powershift transmission includes nine reverse modes.

* * * * *